United States Patent
Higley et al.

(10) Patent No.: US 10,725,249 B2
(45) Date of Patent: Jul. 28, 2020

(54) NON-FERRULE DAMAGING FIELD REMOVABLE GUIDE PIN

(71) Applicant: US Conec, Ltd., Hickory, NC (US)

(72) Inventors: Jason Higley, Hickory, NC (US); Jillcha F. Wakjira, Hickory, NC (US); Darrell R. Childers, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 15/948,786

(22) Filed: Apr. 9, 2018

(65) Prior Publication Data

US 2018/0292614 A1 Oct. 11, 2018

Related U.S. Application Data

(60) Provisional application No. 62/482,873, filed on Apr. 7, 2017.

(51) Int. Cl.
*G02B 6/38* (2006.01)

(52) U.S. Cl.
CPC ......... *G02B 6/3882* (2013.01); *G02B 6/3885* (2013.01)

(58) Field of Classification Search
CPC .................................................. G02B 6/3882
USPC .................................. 385/53–55, 60, 72, 79
See application file for complete search history.

(56) References Cited

U.S. PATENT DOCUMENTS

| | | | | |
|---|---|---|---|---|
| 4,470,660 A | * | 9/1984 | Hillegonds | G02B 6/3847 385/138 |
| 6,886,988 B2 | | 5/2005 | Brown et al. | |
| 8,768,125 B2 | * | 7/2014 | Beatty | G02B 6/3882 385/52 |
| 9,784,925 B2 | * | 10/2017 | Bushnell | G02B 6/3882 |
| 2011/0262075 A1 | * | 10/2011 | Beatty | G02B 6/3882 385/60 |
| 2013/0136401 A1 | * | 5/2013 | Cooke | G02B 6/3885 385/80 |

* cited by examiner

*Primary Examiner* — Robert Tavlykaev
(74) *Attorney, Agent, or Firm* — Michael L. Leetzow, P.A.; Shubhrangshu Sengupta

(57) ABSTRACT

A guide pin for aligning fiber optic ferrules includes an elongated cylindrical element with a proximal end, a distal end, a longitudinal axis therethrough, and a diameter. The distal end has a configuration to be insertable into a first ferrule to align the fiber optic ferrules. The proximal end is configured to be inserted into and retained in a guide pin opening in a second ferrule, the guide pin opening in the second ferrule having a diameter, the proximal end of the elongated cylindrical element having a first portion having a profile that is related to an arc with radius equal to or smaller than the diameter of the guide pin opening and a second portion having a profile defined by a line associated with the arc, the second portion being proximal relative to the first portion.

19 Claims, 10 Drawing Sheets

NON-FERRULE DAMAGING FIELD REMOVABLE GUIDE PIN

REFERENCE TO RELATED CASE

This application claims priority under 35 U.S.C. § 119 (e) to provisional application No. 62/482,873 filed on Apr. 7, 2017, the contents of which are hereby incorporated by reference in their entirety.

BACKGROUND OF THE INVENTION

Traditionally, multi-fiber push on (MPO) fiber optic connectors are designed so that guide pins are permanently mounted in a pin clamp within the fiber optic connector. After the fiber optic ferrule has the optical fibers secured therein and the end face is polished, the guide pins (for the male version of MPO connectors) are inserted into the guide pin holes from the back end of the fiber optic ferrule. When assembling a fiber optic connector in this manner, there is little chance for damage to the front end face of the fiber optic ferrule. The MPO style fiber optic connectors are designed to mate to the opposite pin gender: a male connector mates to a female connector. During installation of MPO connectors in the field, there are occasions when there are either 2 male or 2 female connectors in the layout that need to be mated together. Changing the gender of an MPO fiber optic connector in the field is next to impossible, unless the fiber optic connector has removable guide pins. Even then, when attempting to change the gender through the front face of the fiber optic ferrule in the field, such as illustrated in FIG. 1, it is possible to cause damage to the fiber optic ferrule's guide pin holes as the guide pins are either removed or inserted. The geometry of the groove end of the guide pin and the angle of the guide pin relative to the guide pin hole as it is removed from the fiber optic ferrule determine the degree of damage sustained by the front end face of the fiber optic ferrule. If the damage is severe, a lip can be created on the front end face around the perimeter of the guide pin hole. If the lip is large enough to prevent physical contact of the optical fibers in the mating fiber optic connectors, there can be an impact on the performance of the connection. In order to prevent significant damage to the ferrule guide pin holes at the front end face, it is desirable to control the geometry of the groove end of the guide pin and the removal angle. Ideally the guide pins would be removed from and inserted into the fiber optic ferrule perfectly straight i.e., at an angle of 0°. However, in actual use, the guide pins are removed at a slight angle. Using the tooling described in Applicant's copending patent application Ser. No. 15/801,490 entitled "Fiber Optic Guide Pin Changer and Field Tool with Adapter," the contents of which are incorporated by reference herein, the alignment of the guide pin relative to the guide pin hole is held at an angle less than 10° during insertion and removal of the guide pins through the front face of the fiber optic ferrule.

In order to prevent the guide pins from skiving and damaging the fiber optic ferrule, applicant has changed the proximal end of the guide pins to prevent the fiber optic ferrules from catching the fiber optic ferrules on the front face and in the guide pin holes within a range of insertion/removal angles.

SUMMARY OF THE INVENTION

The present invention is directed to a guide pin for aligning fiber optic ferrules that includes an elongated cylindrical element, the elongated cylindrical element having a proximal end, a distal end, a longitudinal axis therethrough, and a diameter the distal end having a configuration to be insertable into a first ferrule to align the fiber optic ferrules, and the proximal end configured to be inserted into and retained in a guide pin opening in a second ferrule, the guide pin opening in the second ferrule having a diameter, the proximal end of the elongated cylindrical element having a first portion having a profile that is related to an arc with radius equal to or smaller than the diameter of the guide pin opening and a second portion having a profile defined by a line associated with the arc, the second portion being proximal relative to the first portion.

In some embodiments, one vertex of the arc is a pivot point of the proximal end of the elongated cylindrical element of the guide pin.

In some other embodiments, the line associated with the arc is a tangent line of the arc at a junction of the first and second portions.

In another embodiment, the arc has an angle and the angle is a maximum angle of insertion of the guide pin into the guide pin opening in the second ferrule relative to a longitudinal axis through the guide pin opening.

According to another aspect of the present invention, there is a guide pin for aligning fiber optic ferrules that includes an elongated cylindrical element, the elongated cylindrical element having a proximal end, a distal end, a longitudinal axis therethrough, and a diameter, the distal end having a configuration to be insertable into a first ferrule to align the fiber optic ferrules, and the proximal end of the elongated cylindrical element configured to be inserted into and retained in a guide pin opening in a second ferrule, the guide pin opening in the second ferrule having a diameter, the proximal end of the elongated cylindrical element having at least a portion of a profile that is smaller than an arc with radius equal to or smaller than the diameter of the guide pin opening and being centered at a pivot point on the proximal end of the elongated cylindrical element.

According to yet another aspect of the present invention, there is a guide pin for aligning fiber optic ferrules that includes an elongated cylindrical element, the elongated cylindrical element having a proximal end, a distal end, a longitudinal axis therethrough, and a radius, the distal end having a configuration to be insertable into a first ferrule to align the fiber optic ferrules, and the proximal end of the elongated cylindrical element configured to be inserted into and retained in a guide pin opening in a second ferrule, the guide pin opening in the second ferrule having a diameter, the proximal end of the elongated cylindrical element having at least a portion of a profile that is smaller than a tangent line to an arc with radius equal to or smaller than the diameter of the guide pin opening and being centered at a pivot point on the proximal end of the elongated cylindrical element.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
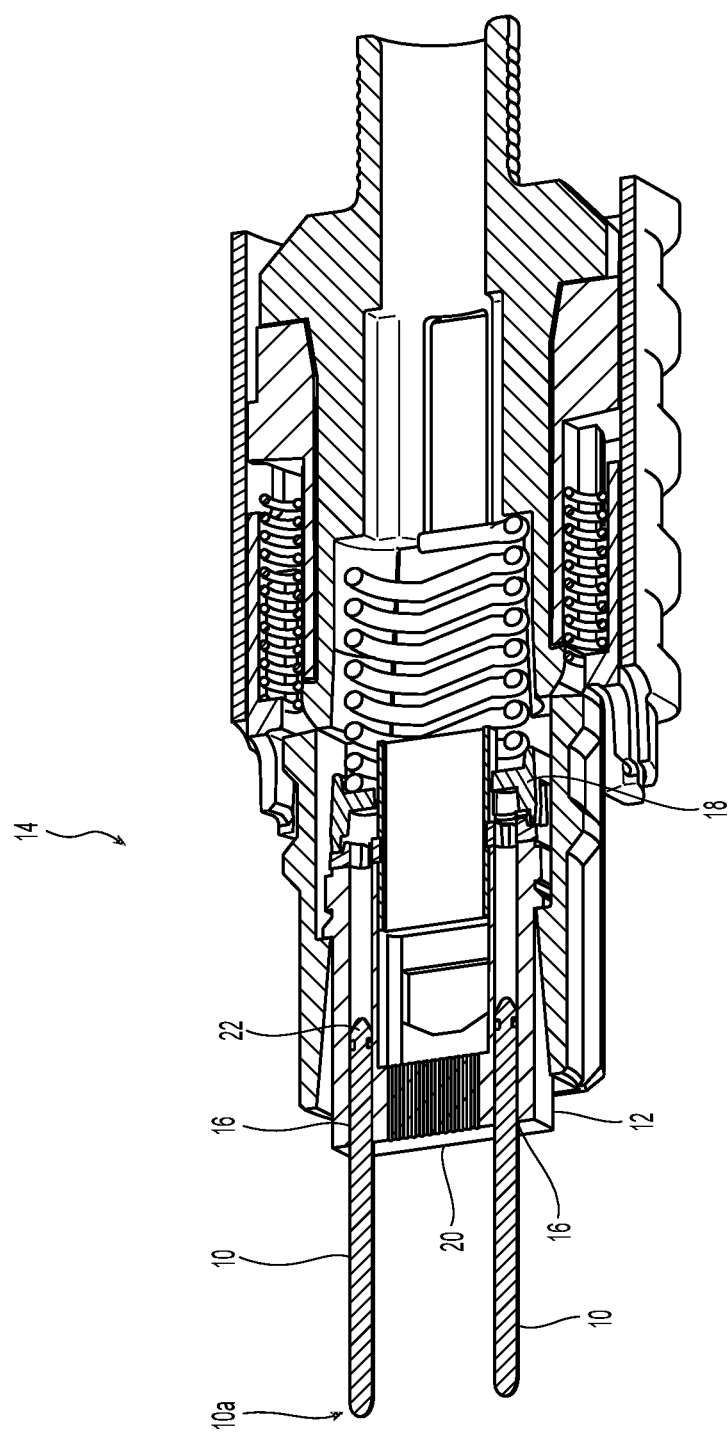
FIG. 1 is a perspective view of a portion of an MPO connector in cross section with prior art guide pins.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
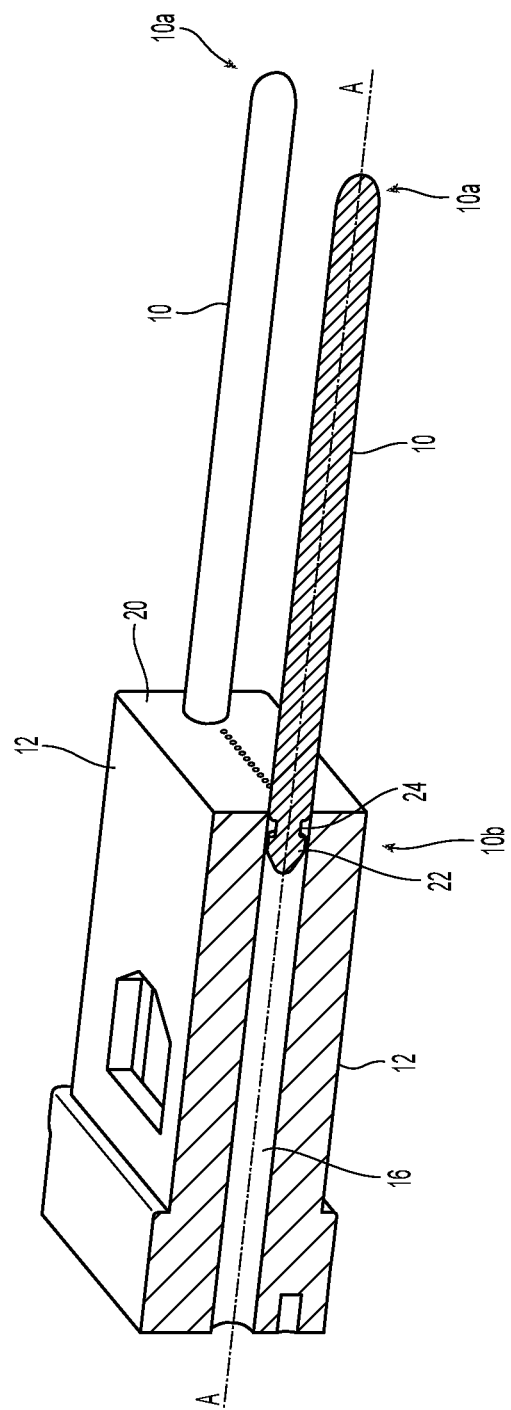
FIG. 2 is a perspective view of a cross section of the ferrule and prior art guide pins of FIG. 1.
Figure 3A:
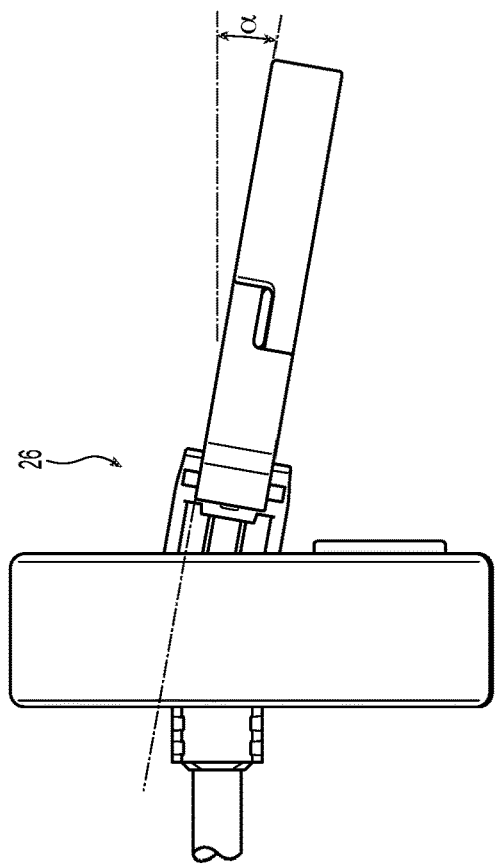
FIG. 3A is a top view of the fiber optic guide pin changer and field tool in FIG. 3.
Figure 3B:
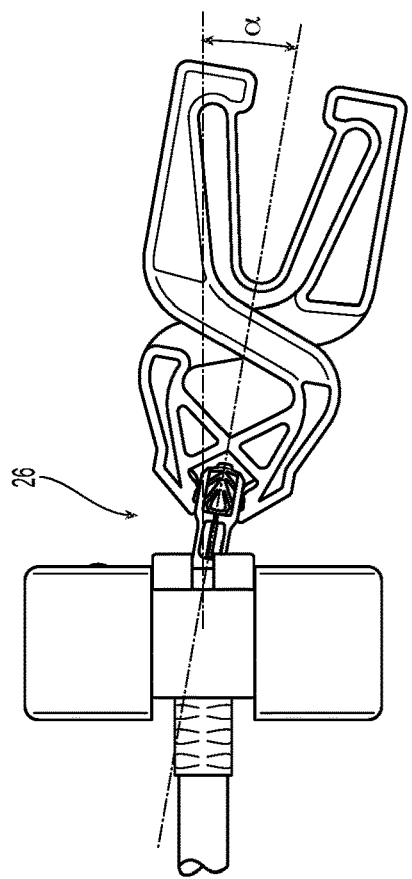
FIG. 3B is a side view of the fiber optic guide pin changer and field tool in FIG. 3.
Figure 3:
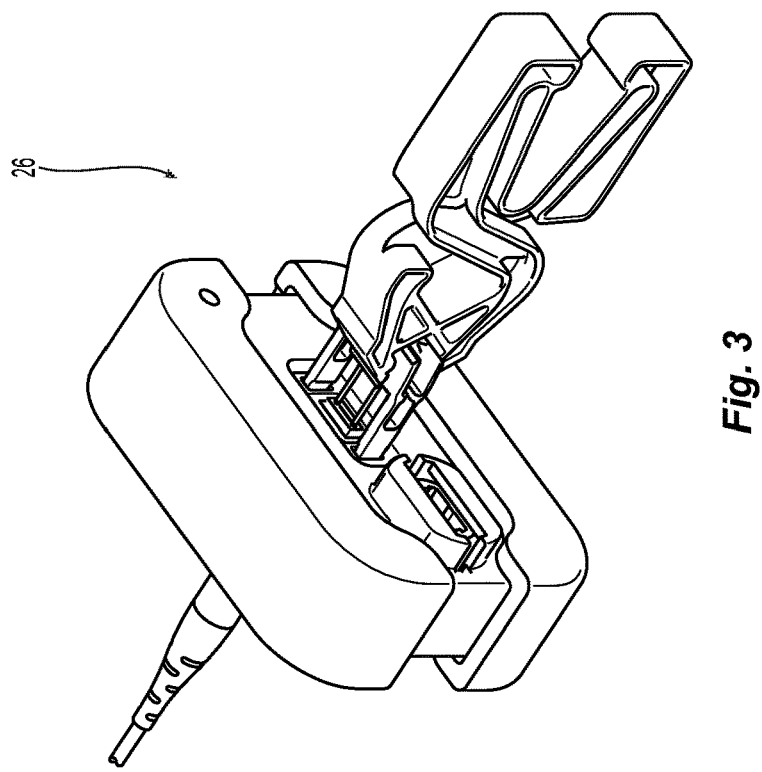
FIG. 3 is a perspective view of a fiber optic guide pin changer and field tool used to remove the guide pins.

Prior art guide pins 10 are illustrated in FIGS. 1 and 2 being inserted (or removed) from a fiber optic ferrule 12 in an MPO-style connector 14. The fiber optic ferrule 12 has two guide pin holes 16 to receive the guide pins 10. The guide pins 10 are an elongated cylindrical element that has a distal end 10a and a proximal end 10b with a longitudinal axis A. The MPO-style connector 14 has pin clamps 18 that allow for the insertion and removal of the guide pins from the connector 14. For example, Applicant has several different guide pin clamps, including those in the pending application Ser. No. 15/383,356 and U.S. Pat. No. 9,778,425, the contents of which are incorporated herein by reference. However, moving the guide pins 10 in and out of the fiber optic ferrule can damage the front face 20 of the fiber optic ferrule 12. The rear portions 22 of the guide pins 10 or the guide pin grooves 24 can catch on the guide pin holes 16 near the front face 20. Additionally, it is near impossible to insert the guide pins 10 straight into the guide pin holes 16, particularly when the technician is out in the field. The use of a tool 26 such as that illustrated in FIG. 3 and available from the applicant assists in inserting and removing the guide pins 10 as straight as possible. In fact, the guide pins can be inserted and removed at less than a 10 degree angle using such a tool 26. FIG. 3A shows the insertion/removal of the guide pins from the top (or bottom) and FIG. 3B shows the insertion/removal of the guide pins from the side. However, even up to 30° or more, the inventive guide pin reduces and/or completely eliminates causing any damage to the fiber optic ferrule 12 from inserting or removing the guide pin 10.

Figure 4:
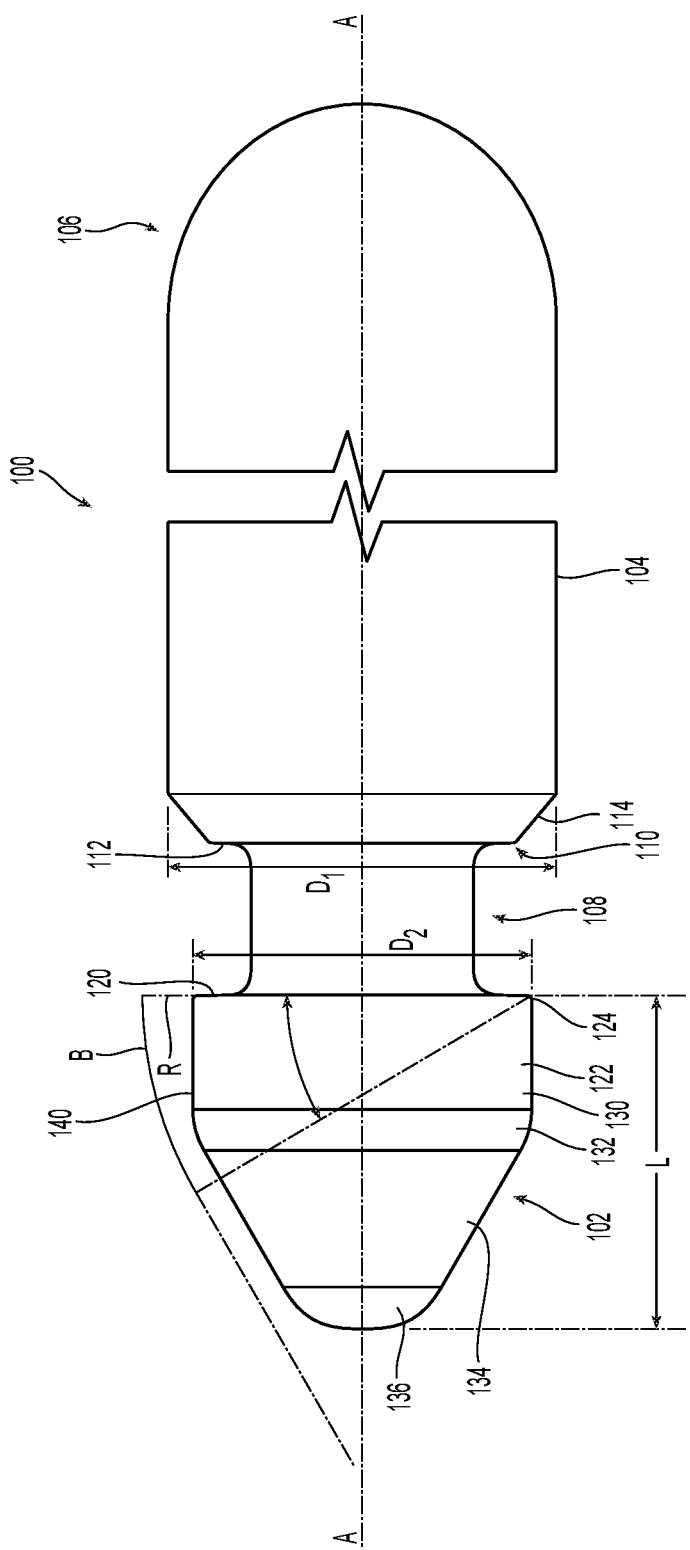
FIG. 4 is an enlarged view of one embodiment of a fiber optic guide pin according to the present invention.
Figure 5:
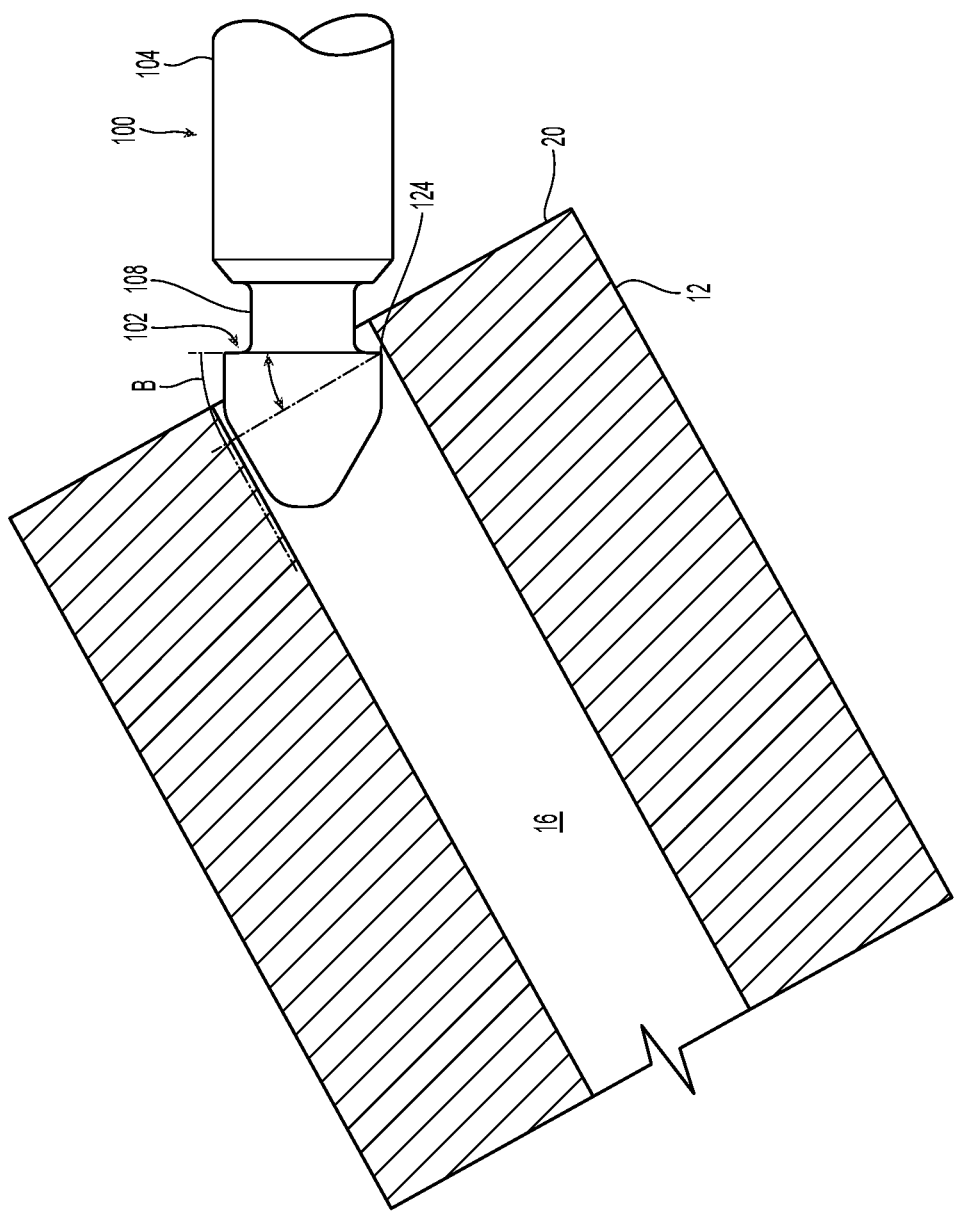
FIG. 5 is an elevational view of a portion of a fiber optic ferrule with the fiber optic guide pin of FIG. 4 partially inserted therein.

FIGS. 4-5 show one embodiment of a guide pin 100 according to the present invention. The guide pin 100 is an elongated cylindrical element 104 with the proximal end 102, a distal end 106, and a longitudinal axis A therethrough. The distal end 106 is configured to be insertable into another ferrule (that is to be mated to the fiber optic connector in which the guide pin 100 is inserted) to align the fiber optic ferrules. It is the proximal end 102 of the guide pin 100 on which the invention is focused.

The remaining portion of the guide pin 100, including the distal end 106, may be the same as the prior art guide pin 10. Other configurations of the distal end (not shown) are possible and would fall within the scope of the present invention. The proximal end 102 of the guide pin 100 is designed to be inserted into and retained by a pin clamp 18, such as those discussed above. Also as discussed above, the guide pin 100 may also be removed from the pin clamp 18 through the front face 20 of the fiber optic ferrule.

The guide pin 100 will have a diameter D1, the diameter D1 being closely matched to the guide pin hole 16. In most cases, the diameter D1 of the guide pin 100 is 0.7 mm, but could be other diameters. The proximal end 102 may have a smaller diameter D2 than D1. As illustrated, D2 is about 0.65 mm in one embodiment.

Turning to FIGS. 4 and 5, a profile of the guide pin 100 is illustrated. The proximal end 102 of the guide pin 100 has a guide pin groove 108. The guide pin groove 108 provides a space for the pin clamp 18 to engage the guide pin 100. The pin clamp 18 has a portion that is disposed within the space above and between the proximal and distal ends of guide pin groove 108 to prevent the guide pin 100 from being removed. On the distal side 110 of the guide pin groove 108 is a distal shoulder 112 that partially forms the guide pin groove 108. The distal shoulder 112 has at the outer edge of the guide pin 100 a chamfered surface 114. The chamfered surface 114 can be useful in the guide pin 100 to avoid contact with the fiber optic ferrule 12 during insertion and removal.

On the opposite side of the guide pin groove 108 is the proximal side 118 and the proximal shoulder 120. The proximal shoulder 120 provides an engagement surface for the pin clamp 18, particularly when the guide pin 100 is pulled trying to remove the guide pin 100. The junction of the proximal shoulder 120 and the outer surface 122 of the guide pin 100 provides a pivot point 124. More generally, the pivot point 124 may be any point on a locus of points formed by an intersection of the proximal shoulder 120 and the outer surface 122. Referring to FIG. 5, the guide pin 100 is inserted into the guide pin holes 16 of fiber optic ferrule 12 in a range of angles—generally 0° to as much as 70°. As indicated in FIG. 5, the proximal shoulder 120 provides a reference surface relative to the guide pin hole 16. As such, the pivot point 124 is the point on the bottom of the guide pin 100 (in this view—although it may be a side portion depending on the path of insertion of the guide pin 100 into the guide pin hole 16) that would make first contact with the guide pin hole 16. The shape of the proximal end 102 of the guide pin 100 is dependent upon the angle of entry by the guide pin 100 into the guide pin hole 16. The shape of the proximal end 102 of the guide pin must be below the line B in order for the guide pin 100 to avoid the sides of the guide pin hole 16. The first part of line B is an arc having a radius R that is equal to, or less than, the diameter of the guide pin hole 16 centered at the pivot point 124. The angle $\alpha$ is the largest angle at which the guide pin 100 would be inserted into the guide pin hole 16 of the fiber optic ferrule 12. As noted above, using the tool 24, the largest angle would be about 10°. It has been determined that an appropriate value for an angle to be used in determining the profile of the guide pin 100 is 30°. This value provides a sufficient amount of flexibility for the use of the guide pin 100. Thus, with a fiber optic ferrule 12 with a guide pin hole 16 having a diameter of 0.7 mm, the first part of line B, the arc, is defined by the equation $y=R \cos \alpha$.

Figure 6:
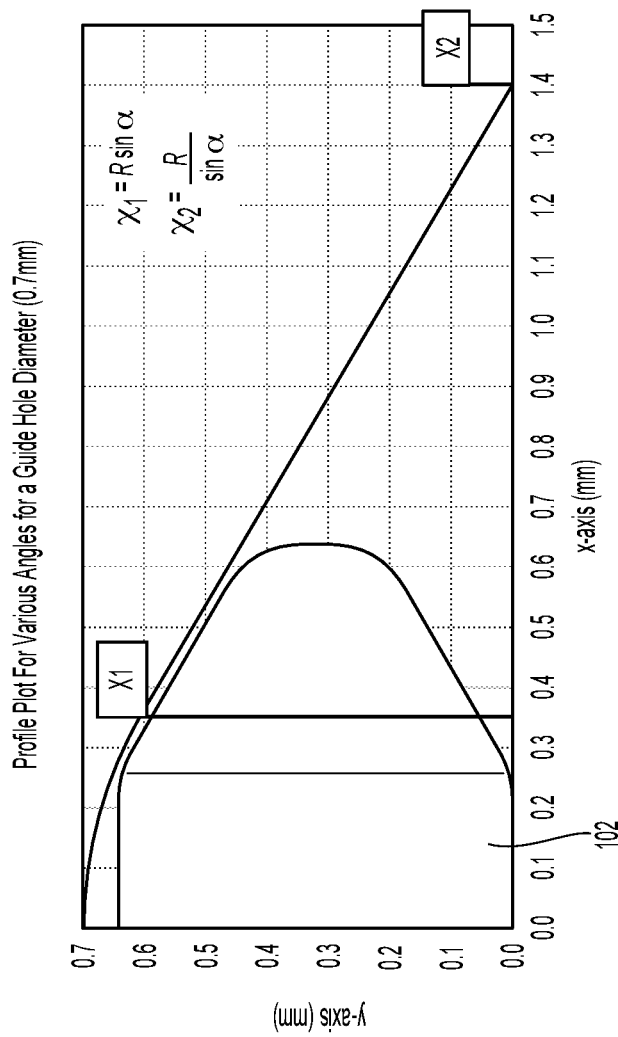
FIG. 6 is a graph illustrating profile of the proximal end of the fiber optic guide pin for an angle of 30° and a guide pin opening of 0.7 mm.

The second part of line B is a line tangent to the first (arc) part of the line B. See FIG. 4. That tangent line is defined as $y=-\tan \alpha\, x+(R \tan \alpha/\sin \alpha)$ where R is the diameter of the guide pin hole 16 and $\alpha$ is the largest angle of guide pin insertion—30° in this case. See also FIG. 6. As noted above, other angles of insertion are possible and fall within the scope of the present invention.

The proximal end 102 of the guide pin 100 may be divided into a plurality of sections based on the profile of those sections. As illustrated in FIG. 4, the proximal end 102 of guide pin 100 may be divided into four sections 130, 132, 134 and 136. While there are lines illustrated in the figures, there may be no real discernible difference or boundary between sections in the embodiments of the guide pin 100. Rather, there may only be the difference in the profile of the guide pin 100 at that section. The first section 130 is illustrated as having a flat outer surface 140, meaning the section 130 is cylindrical in shape. The second section 132 has a profile that matches the first portion of line B ($y=R \cos \alpha$). The first section 130 and the second section 132 may have the same profile and be considered only one section. In that case, the first section 130 and the second section 132 would have a profile that matches the second section 132, that is an arcuate shape. As a result, the diameter of the proximal end 102 would be the same (or about the same) as the elongated cylindrical element 104.

The third section 134 has a profile that matches the second portion of line B ($y=-\tan \alpha\, x+(R \tan \alpha/\sin \alpha)$). This profile of the third section 134 is a linear profile (matching the line) but is not parallel to the longitudinal axis A. See FIG. 4. The final section 136 may be of any shape that provides a smooth transition at the end of the proximal end 102 and with the third section 134.

The length L of the proximal end 102 (proximally from the guide pin grove 108) is determined by the available space in the pin clamp 18. As mentioned above, a portion of the pin clamp 18 engages the guide pin groove 108 to hold the guide pin 100 in the fiber optic ferrule 12 and the distal end must be at a predetermined distance from the front face 20 of the fiber optic ferrule 12 to engage another fiber optic ferrule. Thus, the length of the proximal end 102 of the guide pin 100 depends on the amount of space available behind the pin clamp 18. There may be other components of the fiber optic connector 14 that would need to be considered, e.g., the spring, the spring push, etc.

As noted briefly above, the diameter of the proximal end 102 is smaller than the diameter of the remainder of the guide pin 100 and the diameter of the guide pin hole 16. Yet, the profile of the guide pin 100 must only be below the line B determined by the two equations noted above. As long as the profile of the guide pin 100 is below the line B as determined above, the guide pin 100 will not engage the guide pin holes 16 as long as it is inserted at an angle that is equal to or less than the angle $\alpha$ used to the determine the profile.

Figure 7:
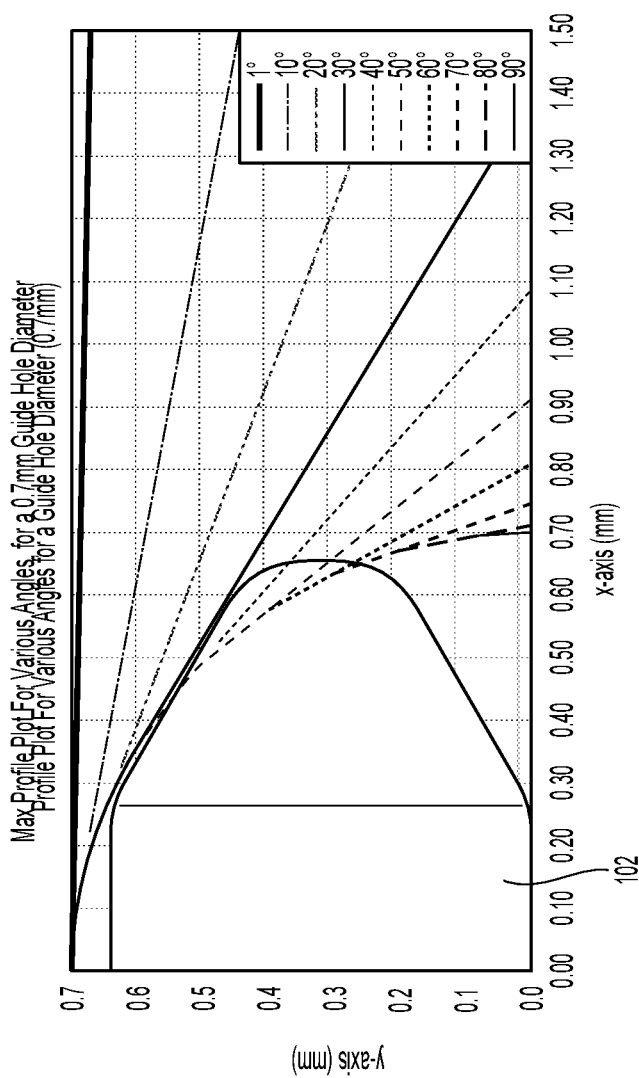
FIG. 7 is graph illustrating profile of the proximal end of the fiber optic guide pin for a variety of angles and a guide pin opening of 0.7 mm.

FIG. 7 illustrates the profiles for a guide pin 100 given a 0.7 mm guide pin hole for a number of insertion angles. As can be seen, the profile of the proximal end 102 changes significantly between 0 and 30°, and then more gradually from 40 to 90 degrees.

Figure 8:
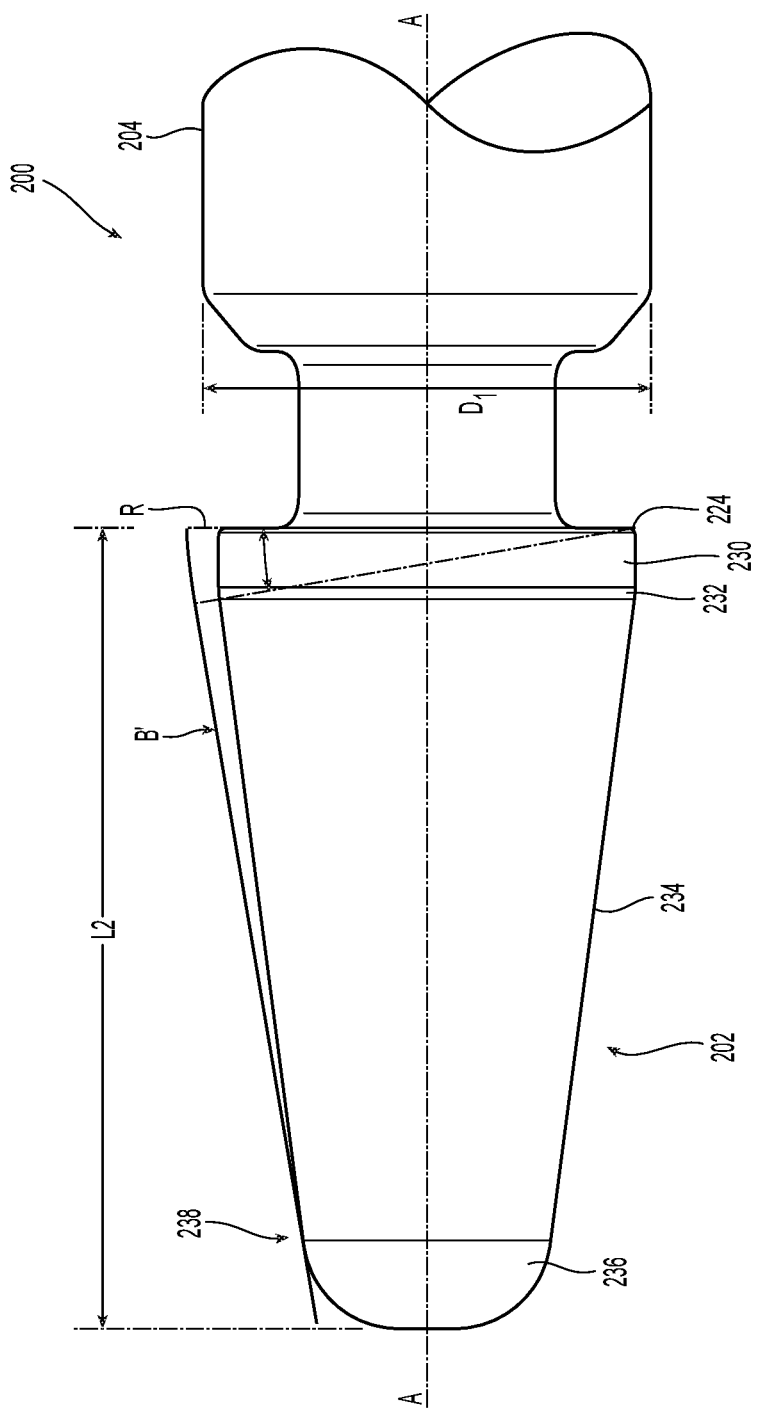
FIG. 8 is an enlarged view of a second embodiment of a fiber optic guide pin according to the present invention.

Another embodiment of a guide pin 200 according to the present invention is illustrated in FIG. 8. The guide pin 200 has an elongated cylindrical element 204 with the proximal end 202, a distal end (not shown) and a longitudinal axis A therethrough. The guide pin 200 also has a diameter D1, a pivot point 224 and a line B'. The proximal end 202 may also be divided into a number of sections 230, 232, 234 and 236. In this case, the profile of the guide pin 200 has an extended third section 234. It should be noted that the profile is under the line B', but the guide pin makes contact with the line B' at a point 238. The guide pin 200 can make contact at the pivot point 224 and at a point on the guide pin 200, as long as the point on the guide pin 200 is at a distance at least 1.2 times the diameter D1 of the guide pin 200 from the pivot point 224. This extra distance (1.2 times the diameter) reduces the force on the fiber optic ferrule 12 to minimize or eliminate the front end face damage.

Figure 9:
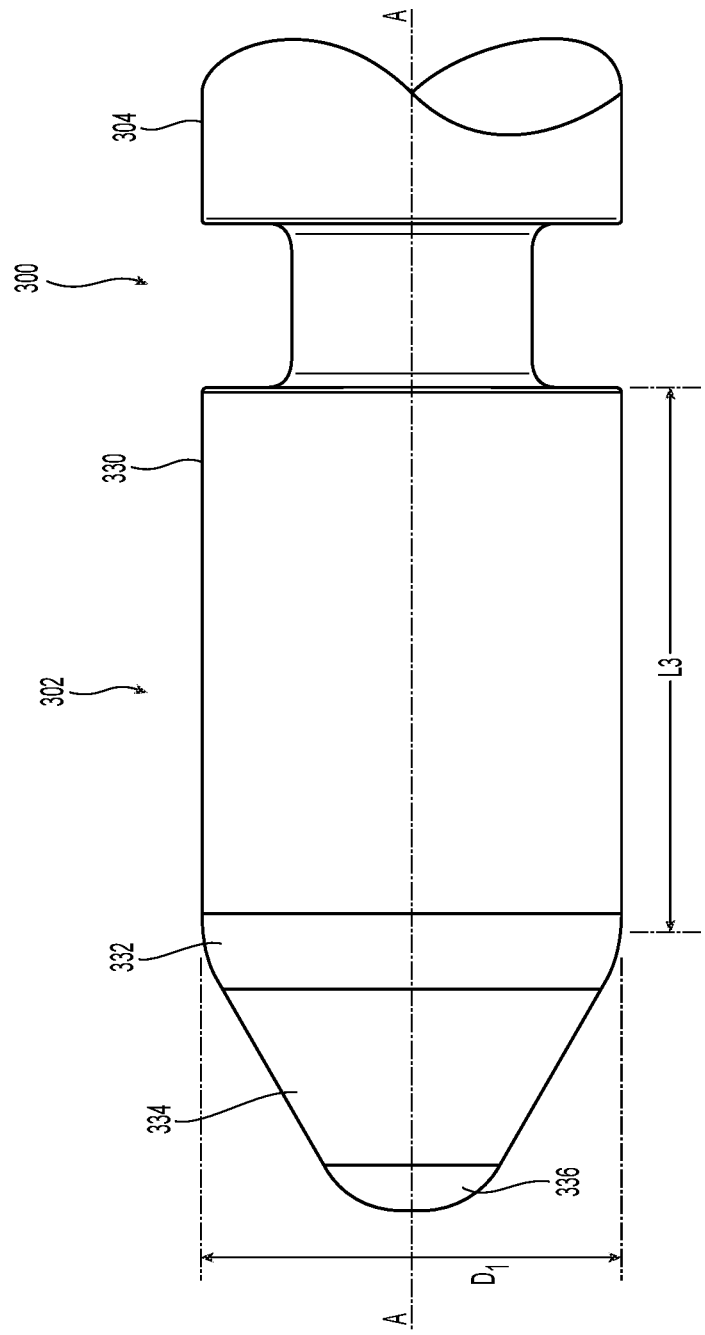
FIG. 9 is an enlarged view of a third embodiment of a fiber optic guide pin according to the present invention.

A third embodiment of a guide pin 300 according to the present invention is illustrated in FIG. 9. The guide pin 300 has an elongated cylindrical element 304 with the proximal end 302, a distal end (not shown) and a longitudinal axis A therethrough. In this embodiment, the guide pin 300 and the proximal end 302 have the same diameter D1. The proximal end 302 may also be divided into a number of sections 330, 332, 334 and 336, similar to the other embodiments. In this case, the profile of the guide pin 300 has an extended first section 330. The first section 300 extends a distance L3, which is at least 1.2 times the guide pin 300 diameter D1. With the first section 300 having a such a long length, the guide pin 300 can not rotate at much of an angle if at all during insertion and removal from a guide pin hole 16. Once the first three sections are inserted into the guide pin hole 16, the third section 330 prevents any rotation of the guide pin 300.

Figure 10:
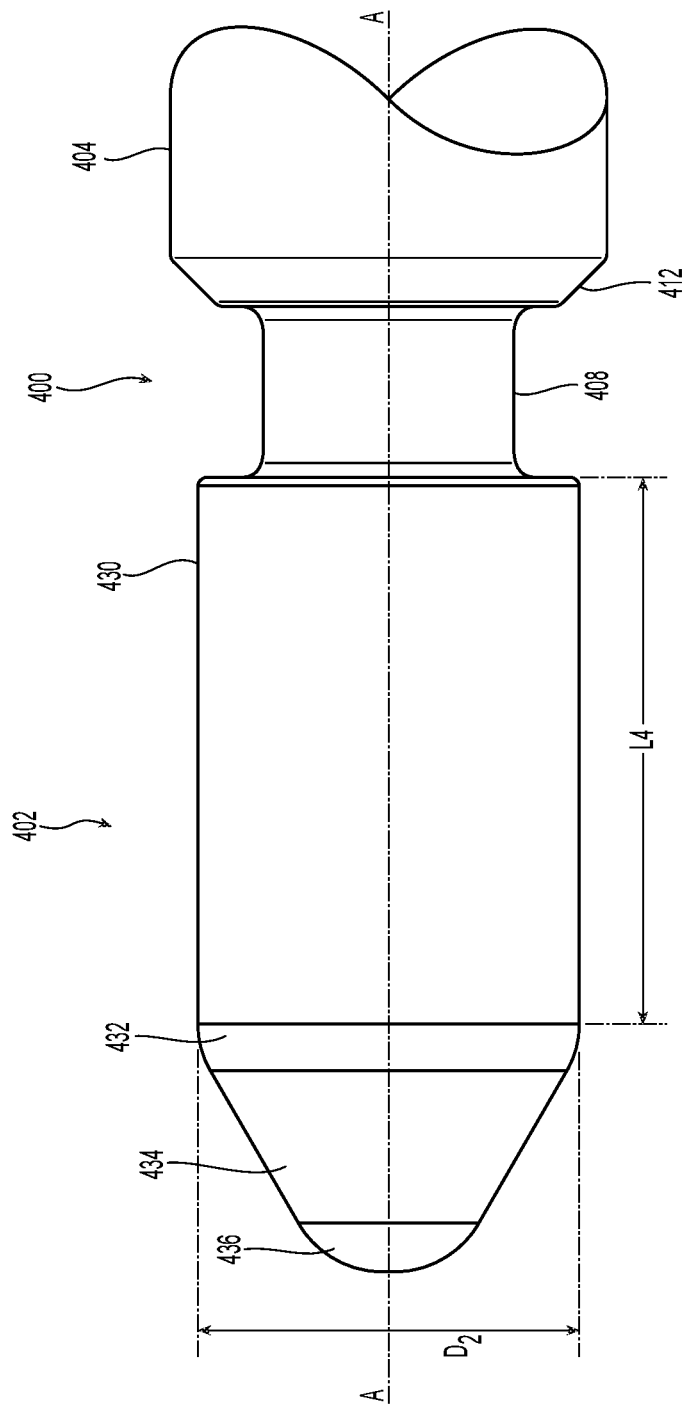
FIG. 10 is an enlarged view of a fourth embodiment of a fiber optic guide pin according to the present invention.

A fourth embodiment of a guide pin 400 according to the present invention is illustrated in FIG. 10. The guide pin 400 has an elongated cylindrical element 404 with the proximal end 402, a distal end (not shown) and a longitudinal axis A therethrough. In this embodiment, the guide pin 400 has a diameter D1, while the proximal end 402 has a different diameter D2. Preferably the diameter D2 is at least 3% less than D1, but may be more or less than that. The proximal end 402 may also be divided into a number of sections 430, 432, 434 and 436, similar to the other embodiments. In this case, the profile of the guide pin 300 has an extended first section 430. The first section 430 extends a distance L4, which may vary depending on the diameter D2. The guide pin groove 408 may also have a chamfered shoulder portion 412 to reduce the potential for the elongated cylindrical element 404 to engage the fiber optic ferrule 12.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A guide pin for aligning fiber optic ferrules comprising:
    an elongated cylindrical element, the elongated cylindrical element having a proximal end with a guide pin groove adjacent thereto, a distal end, a longitudinal axis therethrough, and a diameter;
    the distal end having a configuration to be insertable into a first ferrule to align the fiber optic ferrules; and
    the proximal end configured to be inserted into and retained by a pin clamp in a guide pin opening in a second ferrule, the guide pin opening in the second ferrule having a diameter, the proximal end of the elongated cylindrical element having a first portion having a profile that is related to an arc with radius equal to or smaller than the diameter of the guide pin opening and a second portion having a profile defined by a straight line associated with the arc, the second portion being disposed between the proximal end and the first portion.

2. The guide pin according to claim 1, wherein one vertex of the arc is a pivot point of the proximal end of the elongated cylindrical element of the guide pin.

3. The guide pin according to claim 2, wherein the arc has an angle and the angle is a maximum angle of insertion of the guide pin into the guide pin opening in the second ferrule relative to a longitudinal axis through the guide pin opening.

4. The guide pin according to claim 3, wherein the angle is about 30 degrees or less.

5. The guide pin according to claim 1, wherein the line associated with the arc is a tangent line of the arc at a junction of the first and second portions.

6. The guide pin according to claim 1, wherein the guide pin groove has a distal shoulder, the distal shoulder having a chamfer.

7. The guide pin according to claim 1, wherein the proximal end of the elongated cylindrical element has a diameter that is less than the diameter of the remainder of the elongated cylindrical element.

8. The guide pin according to claim 1, wherein the second portion of the proximal end of the elongated cylindrical element has a length that is at least 1.2 times the diameter of the elongated cylindrical element.

9. The guide pin according to claim 1, wherein the second portion of the proximal end of the elongated cylindrical element has a profile that is not parallel to the longitudinal axis of the elongated cylindrical element.

10. A guide pin for aligning fiber optic ferrules comprising:
an elongated cylindrical element, the elongated cylindrical element having a proximal end with a guide pin groove adjacent thereto, a distal end, a longitudinal axis therethrough, and a diameter;
the distal end having a configuration to be insertable into a first ferrule to align the fiber optic ferrules; and
the proximal end of the elongated cylindrical element configured to be inserted into and retained in a guide pin opening in a second ferrule, the guide pin opening in the second ferrule having a diameter, the proximal end of the elongated cylindrical element having at least a portion of a profile that is smaller than an arc with radius equal to or smaller than the diameter of the guide pin opening, the arc being centered at a pivot point on an outside surface of the elongated cylindrical element at the proximal end.

11. The guide pin according to claim 10, further comprising a guide pin groove adjacent the proximal end.

12. The guide pin according to claim 11, wherein the guide pin groove has a distal shoulder, the distal shoulder having a chamfer.

13. The guide pin according to claim 10, wherein arc has an angle that is about 30 degrees or less.

14. The guide pin according to claim 10, wherein the proximal end of the elongated cylindrical element has a diameter that is less than the diameter of the remainder of the elongated cylindrical element.

15. The guide pin according to claim 10, wherein the second portion of the proximal end of the elongated cylindrical element has a length that is at least 1.2 times the diameter of the elongated cylindrical element.

16. The guide pin according to claim 10, wherein the proximal end of the elongated cylindrical element has a first portion and a second portion, the first portion having at least a portion of a profile that is smaller than an arc with radius equal to or smaller than the diameter of the guide pin opening and the second portion having a profile defined by a line associated with the arc, the second portion being disposed between the proximal end and the first portion.

17. The guide pin according to claim 10, further comprising a shoulder extending at least 1.2 times the diameter of the elongated cylindrical element, the shoulder disposed between the distal end and the proximal end of the elongated cylindrical element.

18. The guide pin according to claim 17, wherein the shoulder has the same diameter as the elongated cylindrical element.

19. A guide pin for aligning fiber optic ferrules comprising:
an elongated cylindrical element, the elongated cylindrical element having a proximal end with a guide pin groove adjacent thereto, a distal end, a longitudinal axis therethrough, and a radius;
the distal end having a configuration to be insertable into a first ferrule to align the fiber optic ferrules; and
the proximal end of the elongated cylindrical element configured to be inserted into and retained in a guide pin opening in a second ferrule, the guide pin opening in the second ferrule having a diameter, the proximal end of the elongated cylindrical element having at least a portion of a profile that is smaller than a tangent line to an arc with radius equal to or smaller than the diameter of the guide pin opening, the arc being centered at a pivot point on an outside surface of the elongated cylindrical element at the guide pin groove.

* * * * *